(12) United States Patent
Takada

(10) Patent No.: US 6,674,473 B1
(45) Date of Patent: Jan. 6, 2004

(54) IMAGE PICKUP APPARATUS

(75) Inventor: Katsuhiro Takada, Hidaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/426,865

(22) Filed: Oct. 26, 1999

(30) Foreign Application Priority Data

Oct. 8, 1999 (JP) ............................................ 11-287732

(51) Int. Cl.$^7$ ........................ H04N 5/225; H04N 5/335; G02B 27/14; G02B 15/14

(52) U.S. Cl. ........................ 348/340; 348/335; 348/272; 359/637; 359/689

(58) Field of Search ................................ 348/335, 340, 348/360, 374, 376, 272, 273; 359/637, 689, 690

(56) References Cited

U.S. PATENT DOCUMENTS

| | | | | |
|---|---|---|---|---|
| 5,471,323 A | * | 11/1995 | Suetsugi et al. | 358/511 |
| 5,721,628 A | * | 2/1998 | Takaragi et al. | 358/518 |
| 5,920,434 A | * | 7/1999 | Mori | 359/663 |
| 5,940,634 A | * | 8/1999 | Nakamura | 396/104 |
| 6,046,772 A | * | 4/2000 | Howell | 348/273 |
| 6,259,473 B1 | * | 7/2001 | Iko et al. | 348/80 |

FOREIGN PATENT DOCUMENTS

| | | | | |
|---|---|---|---|---|
| JP | 08205181 | 8/1996 | | |
| JP | 08205181 A | * | 8/1996 | H04N/9/04 |

\* cited by examiner

Primary Examiner—Aung S. Moe
Assistant Examiner—Lin Ye
(74) Attorney, Agent, or Firm—Pillsbury Winthrop LLP

(57) ABSTRACT

The present invention relates to a compact and low-cost image pickup apparatus capable of photographing a high-quality image comparable to silver halide photographs, particularly an image in which color shift is inconspicuous. In the image pickup apparatus, an image of an object produced by an optical system 10 is formed on an electronic image pickup device 20, thereby obtaining image information concerning the object. The electronic image pickup device 20 and the optical system 10 satisfy the conditions: (1) $1.5 < P < 7.0$; (2) $3.0 < N < 20$; (3) $1.0 \times P < 67 < 5.0 \times P$; and (4) $n_L/n_T < 0.25$; where P is the pixel pitch (given in micrometers) of the image pickup device; N is the number of pixels (given in million) of the image pickup device; and θ is the angle (°) at which the central ray of a light beam exiting from the optical system or a ray passing through the center of a stop is incident on the image pickup device at the maximum image height.

8 Claims, 8 Drawing Sheets

145 Shutter
146 Flash
143 Finder optical system
140 Camera
144 Optical path for finder
141 Photographic optical system
142 Optical path for photography 140 Camera
145 Shutter
144 Optical path for finder
147 Liquid crystal display monitor

IMAGE PICKUP APPARATUS

BACKGROUND OF THE INVENTION

The present invention relates to an image pickup apparatus. More particularly, the present invention relates to a compact and low-cost image pickup apparatus that is capable of photographing high-quality images comparable to silver halide photographs and particularly capable of suppressing the image quality degradation due to color shift caused by the lateral chromatic aberration of a lens.

There are digital cameras designed for business use, e.g. printing, which are capable of obtaining images comparable in quality to photographs. These digital cameras have a large number of pixels, which exceeds 2 million pixels. However, the pixel pitch of the image pickup device is as large as about 7.5 to 10 micrometers or more. Accordingly, there is a limit to the number of devices obtained from one wafer. Therefore, the cost cannot be reduced in excess of a certain limit.

The most effective way of reducing the production cost of image pickup devices is to reduce the device size so that an increased number of devices are obtained from one wafer. However, it is necessary in order to reduce the device size to reduce the number of pixels or the pixel pitch.

Many of image pickup apparatus that have been commercially manufactured as relatively low-cost apparatus use image pickup devices of ⅓ to ⅔ inch size and with about 1 to 2.5 million pixels. The pixel pitch of these image pickup devices is about 3 to 5 micrometers, which is markedly small in comparison to image pickup devices used in the above-described digital cameras for business use.

To obtain a high-quality image with an image pickup device having a large number of pixels, it is essential to use an image pickup device with a smaller pixel pitch.

Major factors in determining high image quality include color shift in addition to resolution. It is known that even if the image-forming performance for a single wavelength is high, when there are large chromatic aberrations, loss of color definition and color shift occur, causing the image quality to be degraded. In the case of an image pickup apparatus using a solid-state image pickup device, e.g. a digital camera, in particular, color shift caused by lateral chromatic aberration rather than axial chromatic aberration becomes a serious problem.

FIG. 12 shows the relationship between the input light intensity (analog image) and the output intensity signal from each pixel. As shown in the figure, in a device in which images formed in a certain fixed area are averaged or added together to form an image signal, such as a solid-state image pickup device, even when an image with gradient light intensity, the resulting image gives a "stairstep" appearance.

In silver halide photography, on the other hand, images are composed of dye units varying in dye size from several micrometers to several tens of micrometers. Thus, the image intensity approximately reproduces the gradient of the light intensity.

In comparison of the above two, there is only a small difference at a position where the gradient of the light intensity is small. However, there is a large difference at a position where the gradient of the light intensity within one pixel is large (e.g. the position of the second pixel from the left). That is, in the case of using an image pickup device, an area where the light intensity is low in the actual image (e.g. the right-hand end in the second pixel from the left) undesirably becomes an image having an average light intensity in the pixel.

This is not a serious problem in a monochrome image or an image in a range where the hues are similar to each other. That is, in such an image, the gradation of the image merely becomes stairstepped. However, in a case where only a specific color is displaced, as shown in FIG. 13, the color difference gives a "stairstep" appearance. For the sake of simplicity, only two colors, i.e. R (red) and B (blue), are considered in FIG. 13. In a case where the image of B is displaced with respect to the image of R as shown in part (a) of FIG. 13, the difference between the colors R and B is as shown in part (b) of FIG. 13. Thus, the color difference signal intensity R-B becomes stairstepped.

It is known that human beings are more sensitive to a color difference than to the absolute value of a color. Therefore, if a human being observes such an image, the color shift appears to be larger than the actual shift. Accordingly, it has been demanded that a lens used in an image pickup apparatus using an image pickup device should be highly corrected for lateral chromatic aberration that causes color shift.

Various studies have heretofore been conducted to determine a size of lateral chromatic aberration necessary for the above-described intensity ratio between two colors displaced relative to each other to appear to be no large color difference to the observer. As a result, it is known that a lateral chromatic aberration not larger than ½ of the pixel pitch allows the color shift of an image to be substantially ignorable.

However, if it is intended to construct an image pickup apparatus capable of providing high-quality images at reduced cost by using a small-sized image pickup device, the pixel pitch becomes 3 to 5 micrometers or less, as stated above. If such an image pickup device is corrected for lateral chromatic aberration on the basis of the conventional concept, the allowable lateral chromatic aberration is 1.5 to 2.5 micrometers or less. Accordingly, an extremely high level of chromatic aberration correction is required.

In the case of an image pickup apparatus using an image pickup device, filters, e.g. an optical low-pass filter and an infrared cutoff filter, are placed between an optical lens and the image pickup device. In the case of a multi-chip type apparatus, an optical path branching prism or the like is frequency placed therebetween. Accordingly, although the physical size is small, a long back focus is required from the optical point of view. Therefore, the common practice is to use a lens type that allows the back focus to be lengthened. Consequently, in many cases, the power distribution is asymmetrical with respect to the stop as viewed from the object side toward the image side.

Accordingly, it is difficult to correct aberrations depending on the field angle, such as distortion and lateral chromatic aberration. There has heretofore been a known method of correcting chromatic aberrations by using anomalous dispersion glass.

To correct lateral chromatic aberration to a value within the above-described range, it is necessary to further increase the number of lens elements using anomalous dispersion glass.

However, anomalous dispersion glass generally has a large coefficient of expansion or has such properties that it is soft and readily scratched. Therefore, a large number of man-hours are needed to process anomalous dispersion glass. Thus, using a large number of lens elements of anomalous dispersion glass causes the processing cost to increase unfavorably.

To realize a high level of chromatic aberration correction with a reduced number of lens elements of anomalous dispersion glass, it is necessary to weaken the power of each lens element by increasing the number of lens elements used or increasing the size of the lens system. This interferes greatly with the achievement of a reduction in size of the apparatus.

Meanwhile, an image obtained by using an image pickup device can be handled spatially as digital data.

Therefore, if the intensity of the image is digitized, it becomes easy to subject the image to electrical processing, e.g. image processing. Accordingly, a method wherein chromatic aberrations produced in a lens system are corrected by image processing has been proposed [Japanese Patent Application Unexamined Publication (KOKAI) No. 8-205181]. However, if image processing is carried out, it becomes necessary to perform processing for preparing data at image points where there is no data in the original image. Consequently, the image quality is unavoidably degraded. Moreover, as the processing becomes complicated, an unfavorably long time is needed until the data is recorded on a recording medium, e.g. a memory card, after the completion of photographing. In addition, because the characteristics of a lens are utilized, different processing operations are required for lenses having different characteristics. Accordingly, different processing operations corresponding to the number of lenses used are needed.

As has been stated above, to obtain images comparable to silver halide photographs, in which color shift is inconspicuous, the prior art causes various problems, e.g. an increase in- processing cost, an increase in size of the lens system, and an increase in image processing time after photographing, and cannot attain a compact and low-cost image pickup apparatus.

SUMMARY OF THE INVENTION

In view of the above-described problems associated with the prior art, an object of the present invention is to provide a compact and low-cost image pickup apparatus capable of photographing high-quality images comparable to silver halide photographs, particularly an image in which color shift is inconspicuous.

To attain the above-described object, the present invention provides an image pickup apparatus wherein an image of an object produced by an optical system is formed on an electronic image pickup device, thereby obtaining image information concerning the object. The electronic image pickup device and the optical system satisfy the following conditions:

$$1.5 < P < 7.0 \quad (1)$$

$$3.0 < N < 20 \quad (2)$$

$$1.0 \times P < \delta < 5.0 \times P \quad (3)$$

$$n_L/n_T < 0.25 \quad (4)$$

where P is the pixel pitch (given in micrometers) of the image pickup device; N is the number of pixels (given in million) of the image pickup device; δ is the maximum value (given in micrometers) of the absolute value of lateral chromatic aberration for a wavelength of 620 nanometers or 460 nanometers in an area containing the center of the image plane and accounting for 90% of the whole image plane; and $n_T$ $n_L$ number of lens elements constituting the optical system and the number of lens elements made of anomalous dispersion glass, respectively.

In this case, it is desirable for the optical system to have a detachable structure.

It is preferable to satisfy the following conditions:

$$1.5 < P < 4.0 \quad (5)$$

$$4.0 < N < 20 \quad (6)$$

In that case, it is even more desirable to satisfy the following condition:

$$6.0 < N < 20 \quad (7)$$

It is preferable that the image pickup device should be a device having a matrix or mosaic color filter array provided over a photoelectric conversion surface and should satisfy the following condition:

$$0 < 1.3 \times P + 4 \quad (8)$$

where θ is the angle at which the central ray of a light beam exiting from the optical system or a ray passing through the center of a stop is incident on the image pickup device at each point within 90% of the image circle.

In this case, it is even more desirable to satisfy the following condition:

$$\theta < P + 4 \quad (9)$$

In addition, it is preferable to satisfy the following condition:

$$1.5 \times P < \delta < 5.0 \times P \quad (10)$$

In addition, it is preferable to satisfy the following condition:

$$n_L/n_T < 0.20 \quad (11)$$

The reasons for adopting the above-described arrangement in the present invention, together with the function thereof, will be described below.

Assuming that the standard angular resolution of the human eye is 1' (corresponding to the visual acuity 1.0), because this is a value that provides the critical resolution, resolution at which a line-and-space pattern contained in an image can be recognized as a sharp image is considered to be lower (larger in angle) than the above-described angular resolution.

For example, if the solid angle of the resolution is assumed to be about 1.67' (corresponding to the visual acuity 0.6), when an image is observed from a position 40 centimeters away from it, for example, it can be recognized as a sharp image down to a size of 0.194 millimeters.

When the image can be recognized as a sharp image as stated above, the above-described color shift can be clearly recognized if it occurs. Accordingly, to make the color shift inconspicuous in this case, the lateral chromatic aberration must be corrected to ½ or less of the pixel pitch.

When a print of A4 size (210 mm×297 mm) is observed from a position 40 centimeters away from it, the number of pixels required in the above-described case is about 1,100× 1,500=1,650,000 pixels. Considering that a margin of about 10 millimeters is left at each of the peripheral edges of ,the print, the number of pixels required is about 1,400,000 pixels.

Basically, numerical values hereinafter presented are determined on the assumption that a print of A4 size is observed from a position 40 centimeters away from it. When there is a linear relationship between the print size and the viewing distance, the number of pixels obtained does not depend on the print size. In general, however, as the print size decreases, the viewing distance tends to increase in comparison to the print size. Therefore, in the case of a small print size, e.g. A6 size (105 mm×149 mm), a smaller number of pixels than the presented number of pixels will suffice. In other words, in the present invention, an image that can be satisfactorily enlarged to a print size of the order of 8×10" size or larger is regarded as a high-quality image comparable to silver halide photographs.

Incidentally, in the case of an image produced by using an image pickup device, pixel units that constitute the image are fixed naturally. Therefore, it is impossible to express an object having a spatial frequency higher than the pixel units. When a test chart having pattern portions with various spatial frequencies is photographed, patterns whose narrowest line width is equal to the pixel pitch are all observed entirely resolved. However, in the case of patterns having a spatial frequency higher than the pixel units, in which the line width is less than the pixel pitch and the narrowest line width is, for example, ½ of the pixel pitch, only low-frequency light and dark patterns, i.e. moire, can be observed.

In the case of an image with the number of pixels obtained by the above-described calculation, the smallest pixel units of the print can be clearly recognized by man with high contrast. Accordingly, when the results of the above-described test chart observation are extended to apply to an ordinary image, the image appears sharp up to a certain spatial frequency, but it rapidly becomes impossible to resolve image components having spatial frequencies higher than the smallest pixel units. Therefore, although the contrast of the image is high, the image is poor in gradation representation and appears rough.

To obtain an image of abundant gradation, it is necessary to represent spatial frequencies up to one close to the resolution limit for the human perception.

In this regard, we have already disclosed that it is necessary in order to obtain image quality equal to that of silver halide photographs to use pixel units corresponding to a solid angle of at least 1.25' (visual acuity 0.8), and about 2,500,000 pixels are needed when a margin of about 10 millimeters is left for A4 size.

The foregoing is a discussion taking notice of resolution. As has been stated above, the problem concerning color shift also arises from the fundamental problem that the displaced portion becomes stairstepped owing to the pixel units. Therefore, when the light intensity is gradient, if the gradient can be represented even more faithfully instead of being averaged, the color shift is not a problem of the image pickup device but a problem associated solely with the lens system, which is totally equivalent to that in the case of silver halide photographs.

To set a level for faithfully representing the gradient of the light intensity, it is possible to consult the above-described evaluation of the human sense of sight with respect to resolution. That is, when a print is observed, it will appear the same to human beings if the light intensity is represented in excess of pixel units that human beings cannot recognize at all. Conversely, if the observer can clearly recognize pixel units, it is impossible to recognize that changes in light intensity are represented faithfully, as stated above.

It was found that in the case of resolution, a solid angle of at least 1.25' (visual acuity 0.8) is needed, as stated above, whereas, in the case of color shift, a larger number of pixels than the number of pixels obtained in the examination of resolution is needed because there are not only changes in intensity but also changes in hue. More specifically, it was found that if an image is composed of pixel units smaller than a solid angle of about 1.11' (visual acuity 0.9), even if color shift caused by lateral chromatic aberration of a lens is represented in a stairstep shape by the pixel units, human beings cannot practically perceive the difference between the stairstep changes in intensity and the changes in intensity in a case where the color shift caused by the lens are represented faithfully.

When the solid angle of 1.11' is converted into the corresponding number of pixels by a calculation similar to the above, it is about 3 million pixels when a margin of 10 millimeters is left at each of the peripheral edges of a print of A4 size.

We examined the allowable limit of the lateral chromatic aberration of the lens in the above-described case, and found that even if the lateral chromatic aberration is greater than the pixel units, human beings cannot clearly recognize color shift because it is generally accompanied by changes in intensity.

In other words, if an image pickup device having 3 million pixels or a larger number of pixels is used, even if there is a lateral chromatic aberration 1.0 or more times larger than the pixel pitch, human beings cannot clearly recognize the color shift.

However, if the lateral chromatic aberration of the lens is 5 or more times larger than the pixel units, the amount of shift caused by the chromatic aberration becomes excessively large, and it becomes impossible to permit the image quality deterioration caused by the color shift even if the effect of photographing with the image pickup device is ignored.

These conditions are expressed by the lower limit of the following condition (2) and condition (3).

$$3.0 < N < 20 \qquad (2)$$

$$1.0 \times P < \delta < 5.0 \times P \qquad (3)$$

where P is the pixel pitch (given in micrometers) of the image pickup device; N is the number of pixels (given in million) of the image pickup device; and δ is the maximum value (given in micrometers) of the absolute value of lateral chromatic aberration for a wavelength of 620 nanometers or 460 nanometers in an area containing the center of the image plane and accounting for 90% of the whole image plane.

The reason why the condition concerning the lateral chromatic aberration is limited within an area containing the center of the image plane and accounting for 90% of the whole image plane is that the remaining area consists substantially of the four corners of the image plane, and it may be supposed that even if color shift occurs in the remaining area, it is unlikely to present a problem in terms of deterioration of the image quality. The reason why the wavelength for which lateral chromatic aberration is obtained is set at 620 nanometers or 460 nanometers is as follows. The e-line, which is handled as a reference welength, is considered to be a representative of a green image, and the above-described wavelengths are selected as representative wavelengths in view of the spectral characteristics of red and blue. The representative wavelengths shift according to the spectral transmittance of color filters used in the apparatus and the spectral sensitivity of the image pickup device. However, there will be no problem in terms of optical design if the representative wavelengths are regarded as being on the order of the above-mentioned wavelengths.

The upper limit of the condition (2), i.e. 20, is determined by taking into consideration the fact that as the number of pixels increases, the image reading speed and the recording speed to a recording medium become excessively low. The upper limit value of the condition (2) corresponds to the above-described solid angle of 0.0513' (visual acuity 2.3), which is determined by taking into consideration the fact that at the upper limit value, even if the image is enlarged to A3 or larger, for example, and thus the viewing distance becomes short in comparison to the print size, the observer cannot practically recognize deterioration of the image quality.

To produce an image pickup device having the above-described number of pixels, it is desirable to satisfy the following condition (1):

$$1.5 < P < 7.0 \tag{1}$$

The upper limit of the condition (1), i.e. 7.0, is set by taking into consideration the cost of the image pickup apparatus. If P is not smaller than the upper limit value, the size of the image pickup device becomes large in comparison to the number of pixels. Consequently, the number of devices obtained from one wafer decreases, causing an increase in cost. The lower limit value of the condition (1), i.e. 1.5, is set by taking into consideration both the image quality deterioration due to the diffraction limit of the optical system and the production cost of the optical system. If P is not larger than the lower limit value, it becomes impossible to ignore the effect of diffractive blurring in a case where the number of pixels is of the order of 3 million even if the optical system has a diffraction limit level of performance. This causes the image quality to be degraded. In the case of using an image pickup device in which the number of pixels exceeds 10 million, if the optical system has performance close to the diffraction limit, the image quality required for a print can be satisfactorily obtained. However, the manufacturing tolerances of each element constituting the optical system become tightened, causing an increase in the processing cost unfavorably.

Adopting a combination of the above-described image pickup device and optical system provides an allowance for the correction of lateral chromatic aberration when the optical system is constructed. Consequently, it is possible to reduce the number of lens elements constituting the optical system and to minimize the number of lens elements using anomalous dispersion glass. Accordingly, it becomes possible to construct a compact and low-cost optical system.

More specifically, the number of lens elements using anomalous dispersion glass can be reduced to 25% or less of the total number of lens elements constituting the optical system. Thus, it becomes possible to reduce the processing cost of the optical system. The condition for this matter is given by the following expression (4):

$$n_L/n_T < 0.25 \tag{4}$$

where $n_T$ and $n_L$ are the number of lens elements constituting the optical system and the number of lens elements made of anomalous dispersion glass, respectively.

The image pickup apparatus according to the present invention may be arranged such that color filters of different colors are successively set on the object side of the apparatus or in the apparatus, and the photographed images are superimposed on one another to construct a color image. Alternatively, two or more image pickup devices are used, and optical paths are led to the respective image pickup devices by an optical path splitting prism, for example, thereby simultaneously photographing images of a plurality of different colors.

The image pickup apparatus may also be arranged such that a device having a matrix or mosaic color filter array provided over a photoelectric conversion surface is used to photograph an image, and the photographed image is subjected to a matrix computation to construct a color image.

The latter system is inferior in image quality to the former system because it needs interpolation of the image by a matrix computation. However, the latter system uses a smaller number of image pickup devices and is capable of obtaining a color image by a smaller number of photographing operations. Therefore, the latter system is superior in terms of cost and ease of use. Accordingly, this system is adopted in many products, particularly consumer products.

In this system, each pixel of the image pickup device comprises a combination of a photoelectric conversion surface region and a color filter element provided thereover. Therefore, if light passing through a color filter element enters a photoelectric conversion surface region different from one at which the light should arrive, information concerning color cannot correctly be obtained. Therefore, it is desirable for light passing through the optical system to be perpendicularly incident on the image pickup device. However, if a light-blocking portion or the like is provided around each photoelectric conversion surface, even if the light is incident on the image pickup device at a certain angle, the effect on the image can be ignored. However, if the light-blocking portion is widened extremely, the area of the photoelectric conversion surface with respect to the whole area decreases. Consequently, the amount of light that can be converted into an electric signal reduces, causing reduction in sensitivity.

The following condition (8) is a condition concerning the allowable range of the angle of incidence on the image pickup device in which the effect on the image can be ignored when a necessary opening ratio is assumed from the viewpoint of sensitivity.

$$0 < 1.3 \times P + 4 \tag{8}$$

where θ is the angle at which the central ray of a light beam exiting from the optical system or a ray passing through the center of the stop is incident on the image pickup device at each point within 90% of the image circle.

If θ is not smaller than the upper limit of the condition (8), i.e. 1.3×P+4, the error of color information obtained at the peripheral portion of the image plane becomes excessively large in comparison to the center of the image plane where the light beam is approximately perpendicularly incident on the image pickup device for the reason stated above, giving rise to a problem that the color in the center of the image plane and the color in the peripheral portion do not agree with each other even if electrical processing is used.

To obtain an image of higher quality, it is preferable to further reduce the pixel units of the image. In this case, it is preferable to satisfy the following condition:

$$4.0 < N < 20 \tag{6}$$

It is even more desirable to satisfy the following condition:

$$6.0 < N < 20 \tag{7}$$

If the condition (7) is satisfied, an image of even higher quality can be obtained.

Regarding the pixel pitch, it is preferable to satisfy the following condition:

$$1.5 < P < 4.0 \quad (5)$$

An effective way of constructing the optical system at further reduced cost is to loosen the restriction on lateral chromatic aberration. It is preferable to satisfy the following condition:

$$1.5 \times P < 5 < 5.0 \times P \quad (10)$$

It is preferable from the viewpoint of further reducing the cost that the number of lens elements using anomalous-dispersion glass among the lens elements constituting the optical system should satisfy the following condition:

$$nL/n_T < 0.20 \quad (11)$$

It is even more desirable that the angle at which a ray exiting from the optical system is incident on the image pickup device should satisfy the following condition:

$$\theta < P + 4 \quad (9)$$

In the image pickup apparatus according to the present invention, the apparatus body and the optical system may be integrated in one unit. Alternatively, the optical system is arranged to be replaceable.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples of the image pickup apparatus according to the present invention will be described below.

Figure 1:
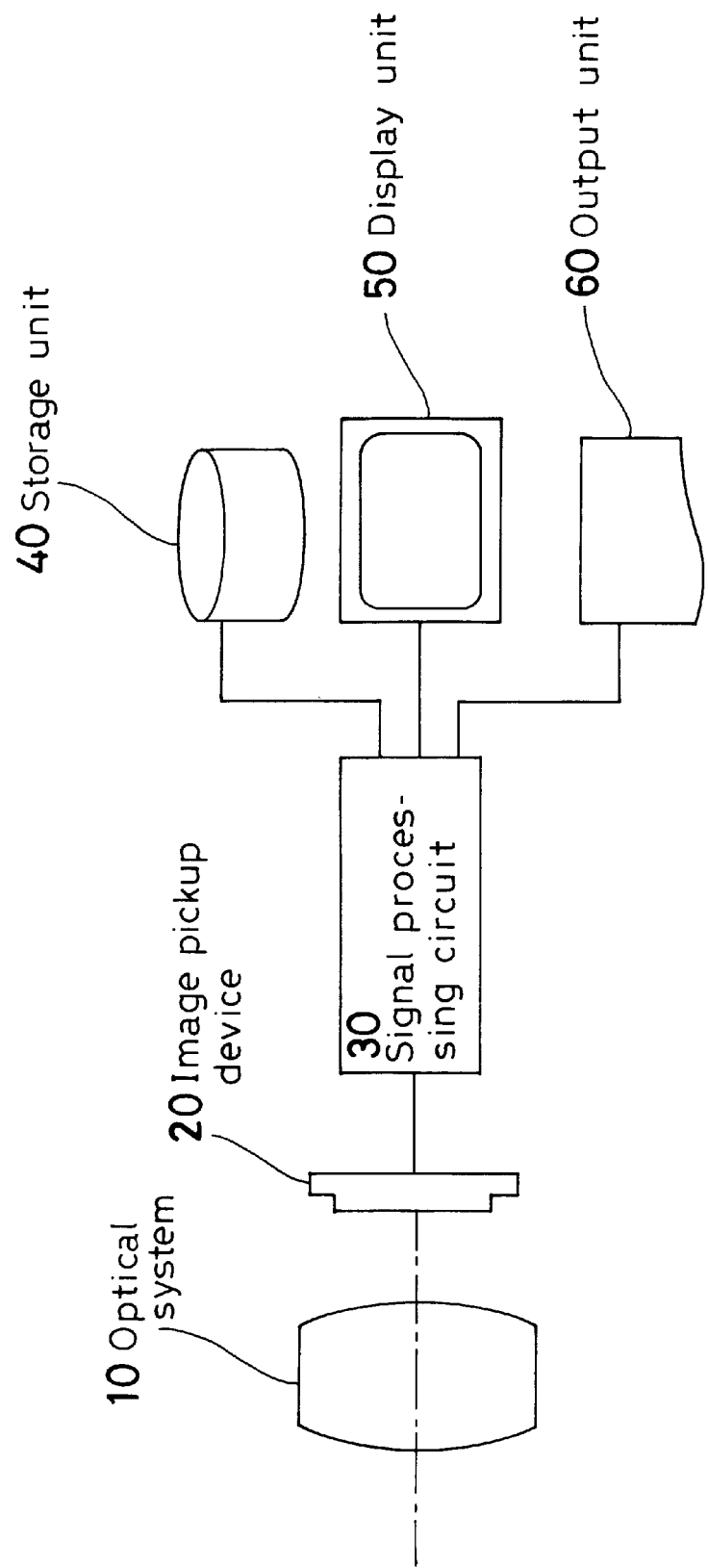
FIG. 1 is a diagram showing the whole arrangement of the image pickup apparatus according to the present invention.

The whole arrangement of the image pickup apparatus according to the present invention is shown in FIG. 1. As shown in the figure, the image pickup apparatus includes an optical system 10 for forming an image of an object, an image pickup device 20, e.g. a CCD or a CMOS, placed at the image-formation position of the optical system 10, a signal processing circuit 30 for processing an image signal obtained with the image pickup device 20, a storage unit 40 connected to the signal processing circuit 30 to store the obtained image data, a display unit 50 connected to the signal processing circuit 30 to display the obtained image, and an output unit 60, e.g. a printer, which outputs the obtained image.

The following is a description of Examples 1 and 2 regarding mainly a lens system used as the optical system 10 and the image pickup device 20 used in accordance with the lens system.

EXAMPLE 1

In this example, a fixed focal length lens system is used as the optical system 10. An image pickup device used as the image pickup device 20 is as follows: The device size is ⅔ inch (6 mm×8.8 mm); the number of pixels is 2,130×2,840= 6,050,000 pixels; and the pixel pitch P is 3.1 micrometers.

Figure 2:
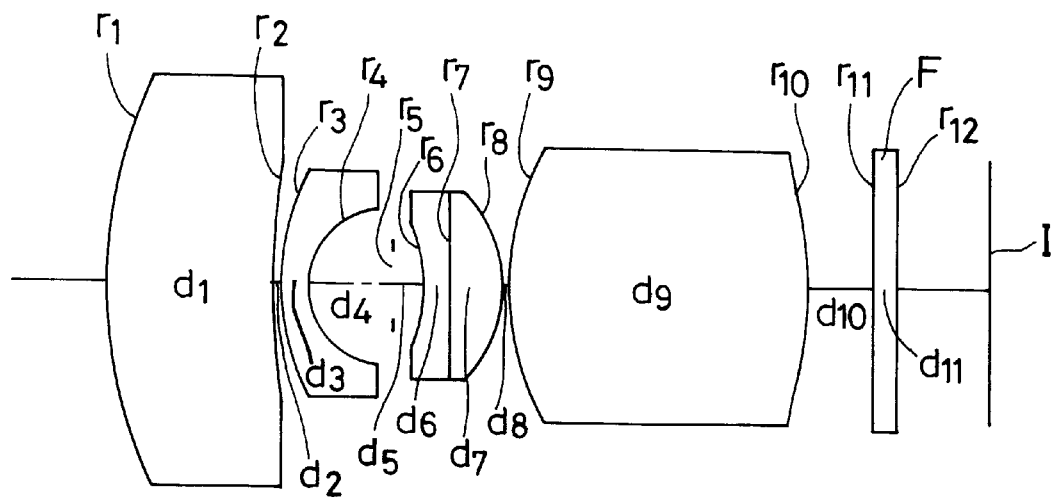
FIG. 2 is a sectional view of a lens system constituting an optical system in Example 1 of the present invention.
Figure 3:
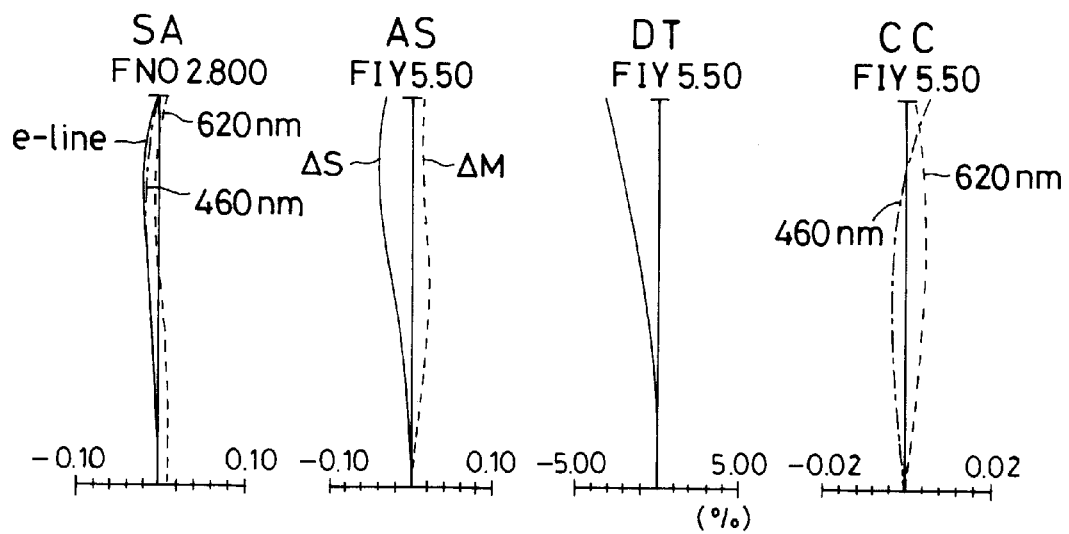
FIG. 3 is an aberrational diagram illustrating aberrations in the lens system in Example 1.

The lens system that constitutes the optical system 10 is a retrofocus type fixed focal length lens system as shown in the sectional view of FIG. 2. The lens system includes, in order from the object side, a positive meniscus lens having a convex surface directed toward the object side, a negative meniscus lens having a convex surface directed toward the object side, a stop, a cemented lens consisting of a biconcave lens and a biconvex lens, and a biconvex lens. A plane-parallel plate F, which constitutes a cover glass and filters for the image pickup device 20, is placed between the lens system and the image plane I. Numerical data concerning this lens system will be shown later. An aspherical surface is used for the image-side surface of the biconvex lens closest to the image plane. Aberrations in this example are shown in FIG. 3. In the aberrational diagram, SA denotes spherical aberration; AS denotes astigmatism; DT denotes distortion; and CC denotes lateral chromatic aberration (the same shall apply in the following aberrational diagrams). In the aberration diagram, the reference wavelength is the e-line, and the spherical aberration and the lateral chromatic aberration for a wavelength of 620 nanometers and a wavelength of 460 nanometers are shown in addition to those for the reference wavelength. In the diagram, "FIY" denotes the image height.

In this example, anomalous dispersion glass is not used.

In Example 1: the value concerning the condition (1) is P=3.1 micrometers; the value concerning the condition (2) is N=6.05: the value concerning the condition (3) is δ=4.4 micrometers (620 nanometers); the value concerning the condition (4) is $n_L/n_T$=0/5=0; and the value concerning the condition (8) is θ=7.40. Thus, Example 1 satisfies all the conditions. Accordingly, it is possible to obtain a compact and low-cost image pickup apparatus capable of obtaining a high-quality image comparable to silver halide photographs, particularly a high-quality image in which color shift is inconspicuous.

EXAMPLE 2

In this example, a zoom lens system is used as the optical system 10. An image pickup device used as the image pickup device 20 is as follows: The device size is ½ inch (4.8 mm×6.4 mm); the number of pixels is 1,780×2,370=4,220,000 pixels; and the pixel pitch P is 2.7 micrometers.

Figure 4:
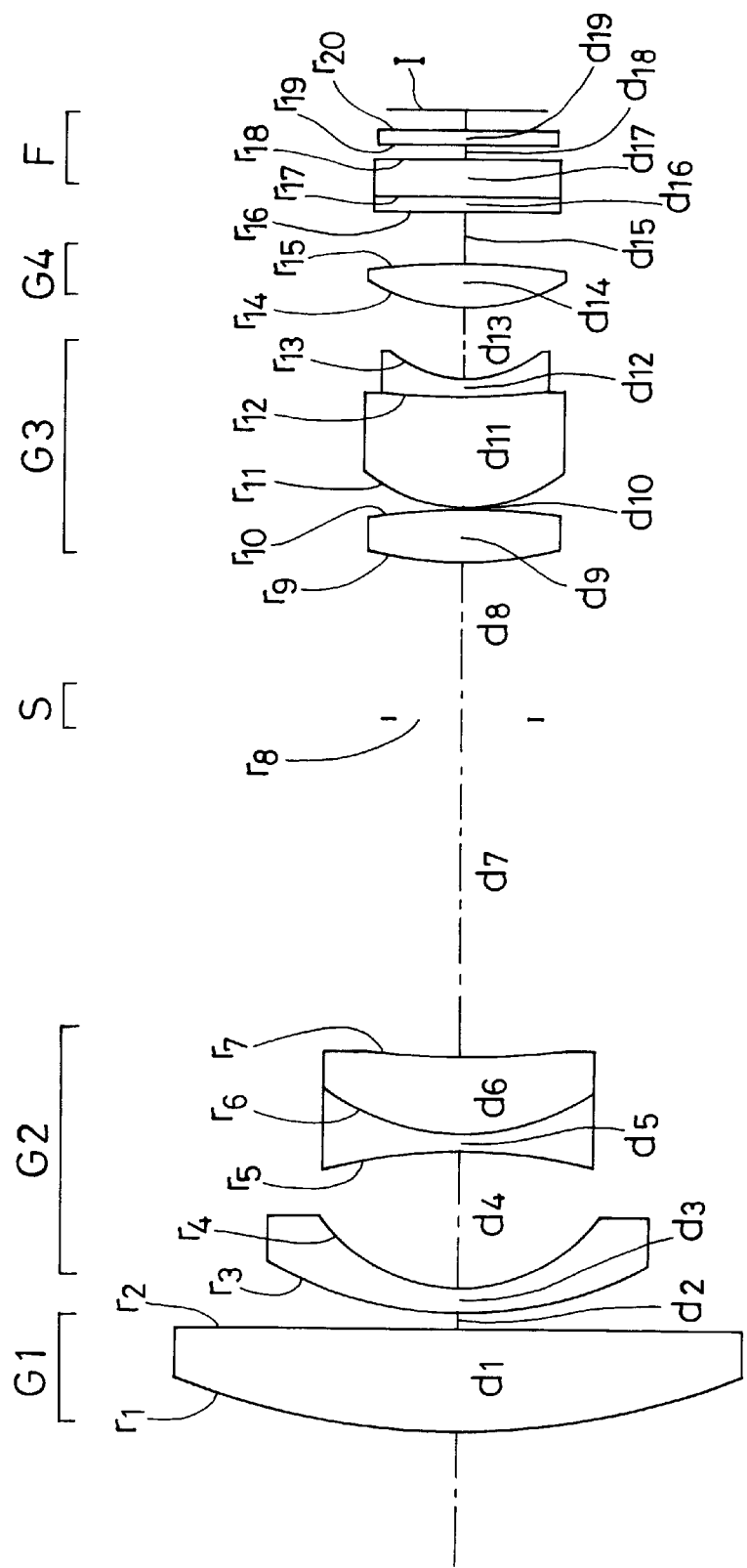
FIG. 4 is a sectional view of a zoom lens system constituting an optical system in Example 2 of the present invention, showing the zoom lens system at the wide-angle end.
Figure 5:
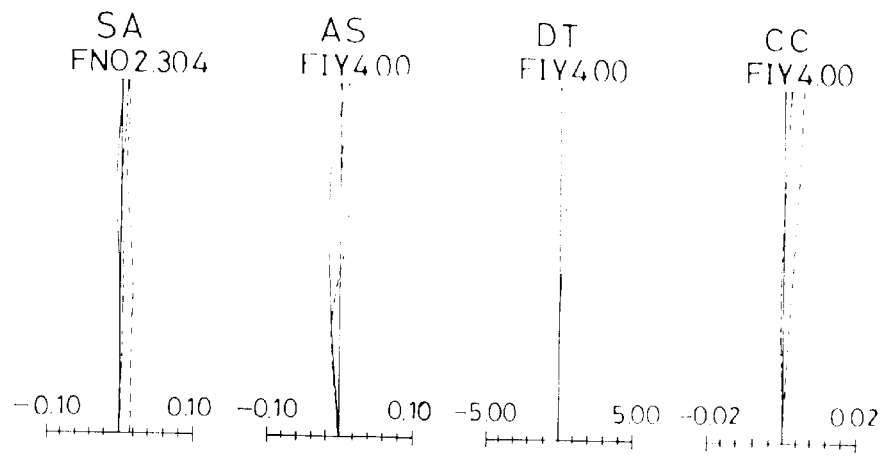
FIG. 5 is an aberrational diagram illustrating aberrations produced at the wide-angle end of the zoom lens system in Example 2.
Figure 6:
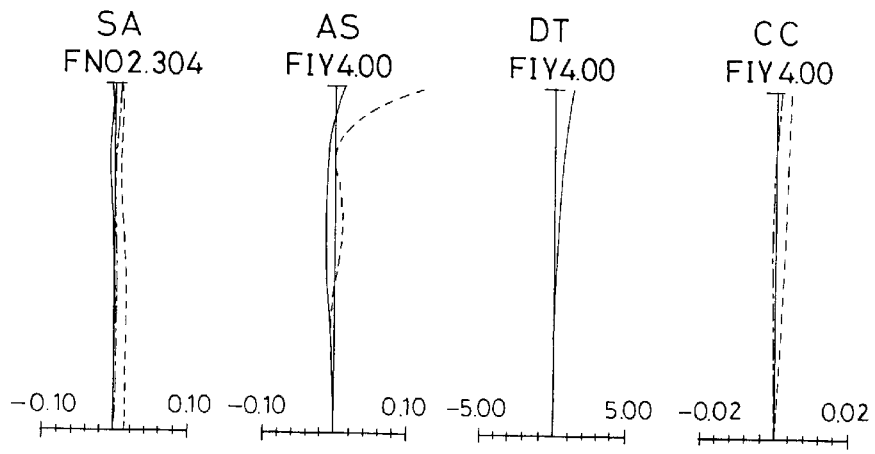
FIG. 6 is an aberrational diagram illustrating aberrations produced at the standard position of the zoom lens system in Example 2.
Figure 7:
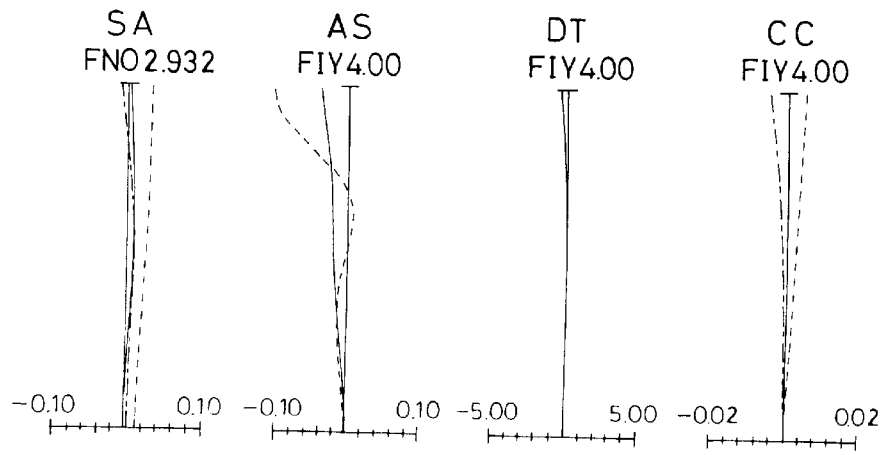
FIG. 7 is an aberrational diagram illustrating aberrations produced at the telephoto end of the zoom lens system in Example 2.

FIG. 4 is a sectional view of the zoom lens system that constitutes the optical system 10, showing the zoom lens system at the wide-angle end. As shown in the figure, the zoom lens system includes, in order from the object side, a first lens unit G1, a second lens unit G2, a stop S, a third lens unit G3, and a fourth lens unit G4. The first lens unit G1 has a single plano-convex lens having a convex surface directed toward the object side. The second lens unit G2 has three lenses, i.e. a negative meniscus lens having a convex surface directed toward the object side, and a cemented lens consisting of a biconcave lens and a positive meniscus lens having a convex surface directed toward the object side. The third lens unit G3 has three lenses, i.e. a biconvex lens made of glass having anomalous dispersion properties in which $\theta_{gd}$=1.243, and a cemented lens consisting of a positive meniscus lens having a convex surface directed toward the object side and a negative meniscus lens having a convex surface directed toward the object side. The fourth lens unit G4 has a single biconvex lens. During zooming from the wide-angle end to the telephoto end, the first lens unit G1 and the stop S are fixed. The second lens unit G2 moves from the object side toward the image side. The third lens unit G3 and the fourth lens unit G4 move toward the object side while widening the spacing therebetween. A plane-parallel plate F, which constitutes a cover glass and filters for the image pickup device 20, is placed between the lens system and the image plane I. Numerical data concerning this lens system will be shown later. An aspherical surface is used for the surface of the third lens unit G3 that is closest to the object side, and another aspherical surface is used for the object-side surface of the fourth lens unit G4. Aberrations in this example at the wide-angle end are shown in FIG. 5. Aberrations at the standard position are shown in FIG. 6. Aberrations at the telephoto end are shown in FIG. 7.

In Example 2: the value concerning the condition (1) is P=2.7 micrometers; the value concerning the condition (2) is N=4.22: the valgue concerning the condition (3) is δ=5.0 micrometers (620 nanometers at the wide-angle end), δ=3.5 micrometers (620 nanometers at the standard position), and δ=4.4 micrometers (460 nanometers at the telephoto end); the value concerning the condition (4) is $n_L/n_T$=/8=0.125; and the value concerning the condition (8) is θ=1.7° (at the wide-angle end), θ=2.8° (at the standard position), and θ=3.70 (at the telephoto end). Thus, Example 2 satisfies all the conditions. Accordingly, it is possible to obtain a compact and low-cost image pickup apparatus capable of obtaining a high-quality image comparable to silver halide photographs, particularly a high-quality image in which color shift is inconspicuous.

Numerical data concerning the optical system 10 in each of the above-described examples will be shown below. In the following: reference character f denotes the focal length of the entire system; $F_{NO}$ is F-number; 2ω is the field angle; fback focus; $r_1, r_2$ . . . are the radii of curvature of lens surfaces; $d_1, d_2$ . . . are the spacings between adjacent lens surfaces; $n_{e1}, n_{e2}$ . . . are the refractive indices of the lenses for the e-line; and $v_{d1}$, $vd_2$ . . . are the Abbe's numbers of the lenses. Assuming that z is taken in the direction of the optical axis, where the direction of travel of light is defined as a positive direction, and y is the distance from the optical axis in a direction perpendicular to the optical axis, an aspherical configuration is expressed by $$z=(y^2/r)/[1+\{1-(K+1)(y/r)^2\}^{1/2}]+A_4y^4+A_6y^6+A_8y^8+A_{10}y^{10}A_{12}y^{12}$$

where r is a paraxial curvature radius; K is a conic coefficient; and $A_4, A_6, A_8, A_{10}$ and $A_{12}$ are 4th-, 6th-, 8th-, 10th- and 12th-order aspherical coefficients, respectively.

EXAMPLE 1

| f = 9.40 | | | |
| --- | --- | --- | --- |
| $F_{NO}$ = 2.8 | | | |
| 2ω = 62.32° | | | |
| $f_B$ = 3.821 | | | |
| $r_1$ = 19.2904 | $d_1$ = 7.1301 | $n_{e1}$ = 1.85504 | $v_{d1}$ = 23.78 |
| $r_2$ = 31.5332 | $d_2$ = 0.2500 | | |
| $r_3$ = 9.5862 | $d_3$ = 1.2000 | $n_{e2}$ = 1.48915 | $v_{d2}$ = 70.23 |
| $r_4$ = 3.3172 | $d_4$ = 3.6931 | | |
| $r_5$ = ∞ (Stop) | $d_5$ = 1.2117 | | |
| $r_6$ = −7.4389 | $d_6$ = 1.2000 | $n_{e3}$ = 1.85504 | $v_{d3}$ = 23.78 |
| $r_7$ = 285.9688 | $d_7$ = 2.2502 | $n_{e4}$ = 1.73234 | $v_{d4}$ = 54.68 |
| $r_8$ = −5.8435 | $d_8$ = 0.1500 | | |
| $r_9$ = 11.4711 | $d_9$ = 12.8153 | $n_{e5}$ = 1.60548 | $v_{d5}$ = 60.64 |
| $r_{10}$ = −13.4741 (Aspheric) | $d_{10}$ = 2.7500 | | |
| $r_{11}$ = ∞ | $d_{11}$ = 1.0000 | $n_{e6}$ = 1.48915 | $v_{d6}$ = 70.23 |
| $r_{12}$ = ∞ | | | |

Aspherical Coefficients

10th surface

K = 0.00000
$A_4$ = 3.56156 × 10$^{-4}$
$A_6$ = 3.16853 × 10$^{-9}$
$A_8$ = 4.61305 × 10$^{-8}$
$A_{10}$ = 0
$A_{12}$ = 0

EXAMPLE 2

| f = 6.62~11.26~19.10 | | | |
| --- | --- | --- | --- |
| $F_{NO}$ = 2.04~2.30~2.93 | | | |
| 2ω = 63.90°~38.69°~23.79° | | | |
| $f_B$ = 0.95~0.95~0.95 | | | |
| $r_1$ = 40.3034 | $d_1$ = 5.2797 | $n_{e1}$ = 1.48915 | $v_{d1}$ = 70.23 |
| $r_2$ = ∞ | $d_2$ = (Variable) | | |
| $r_3$ = 20.8569 | $d_3$ = 1.2500 | $n_{e2}$ = 1.85504 | $v_{d2}$ = 23.78 |
| $r_4$ = 8.8296 | $d_4$ = 6.8718 | | |
| $r_5$ = −27.1565 | $d_5$ = 1.0000 | $n_{e3}$ = 1.48915 | $v_{d3}$ = 70.23 |
| $r_6$ = 11.5347 | $d_6$ = 3.9456 | $n_{e4}$ = 1.85504 | $v_{d4}$ = 23.78 |
| $r_7$ = 37.7190 | $d_7$ = (Variable) | | |
| $r_8$ = ∞ (Stop) | $d_8$ = (Variable) | | |
| $r_9$ = 20.0455 (Aspheric) | $d_9$ = 2.6165 | $n_{e5}$ = 1.57098 | $v_{d5}$ = 71.30 |
| $r_{10}$ = −29.3358 | $d_{10}$ = 0.2000 | | |
| $r_{11}$ = 9.0271 | $d_{11}$ = 5.5316 | $n_{e6}$ = 1.77621 | $v_{d6}$ = 49.60 |
| $r_{12}$ = 82.0666 | $d_{12}$ = 0.9000 | $n_{e7}$ = 1.85504 | $v_{d7}$ = 23.78 |
| $r_{13}$ = 5.8260 | $d_{13}$ = (Variable) | | |

-continued

| | | | |
|---|---|---|---|
| $r_{14} = 11.0356$ (Aspheric) | $d_{14} = 2.0471$ | $n_{e8} = 1.59142$ | $v_{d8} = 61.28$ |
| $r_{15} = -35.4897$ | $d_{15} =$ (Variable) | | |
| $r_{16} = \infty$ | $d_{16} = 0.8000$ | $n_{e9} = 1.51825$ | $v_{d9} = 64.14$ |
| $r_{17} = \infty$ | $d_{17} = 1.8000$ | $n_{e10} = 1.54979$ | $v_{d10} = 62.84$ |
| $r_{18} = \infty$ | $d_{18} = 0.8000$ | | |
| $r_{19} = \infty$ | $d_{19} = 0.7500$ | $n_{e11} = 1.51825$ | $v_{d11} = 64.14$ |
| $r_{20} = \infty$ | | | |

Zooming Spaces

| f | 6.62 | 11.26 | 19.10 |
|---|---|---|---|
| $d_2$ | 1.0000 | 11.1208 | 16.9659 |
| $d_7$ | 17.4769 | 7.3561 | 1.5110 |
| $d_8$ | 8.2911 | 6.0038 | 1.4970 |
| $d_{13}$ | 3.6636 | 4.3896 | 5.9973 |
| $d_{15}$ | 2.6597 | 4.2210 | 7.1201 |

Aspherical Coefficients

9th surface

K = 0.00000
$A_4 = -6.09597 \times 10^{-5}$
$A_6 = 1.98645 \times 10^{-7}$
$A_8 = 3.03497 \times 10^{-8}$
$A_{10} = -3.82462 \times 10^{-9}$
$A_{12} = 1.06173 \times 10^{-10}$ 14th surface K = 0.00000
$A_4 = -5.31919 \times 10^{-5}$
$A_6 = -1.01532 \times 10^{-5}$
$A_8 = 1.35032 \times 10^{-6}$
$A_{10} = -7.60925 \times 10^{-8}$
$A_{12} = 1.54969 \times 10^{-9}$ Although the present invention has been described with regard mainly to a digital camera, it should be noted that the present invention is similarly applicable to a case where a still picture is viewed by using other image pickup apparatus (e.g. a digital video camera).

The above-described image pickup apparatus according to the present invention can be used in image pickup apparatuses, particularly in electronic cameras, video cameras, etc., in which an object image is formed, and the object image is received with an image pickup device, such as a CCD, to take a picture of the object. Embodiments in which the present invention is applied to such apparatuses will be described below.

Figure 8:
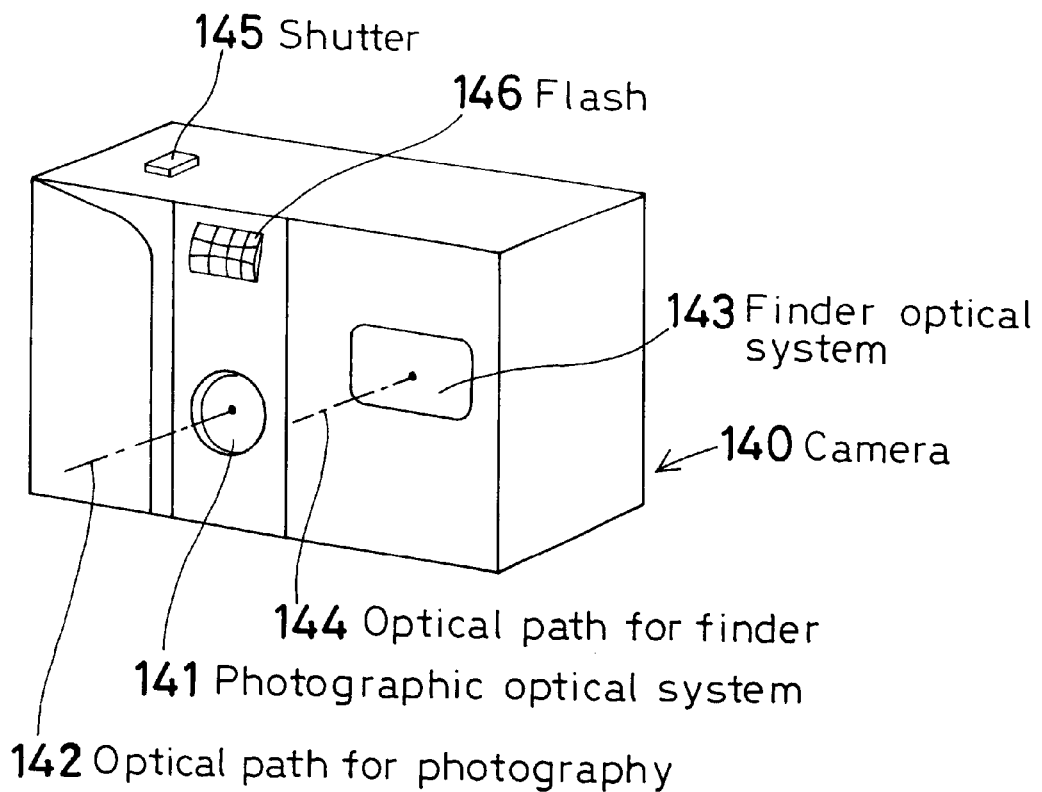
FIG. 8 is a perspective view showing the external appearance of an image pickup apparatus according to the present invention as arranged in the form of an electronic camera, as viewed from the front side thereof.
Figure 9:
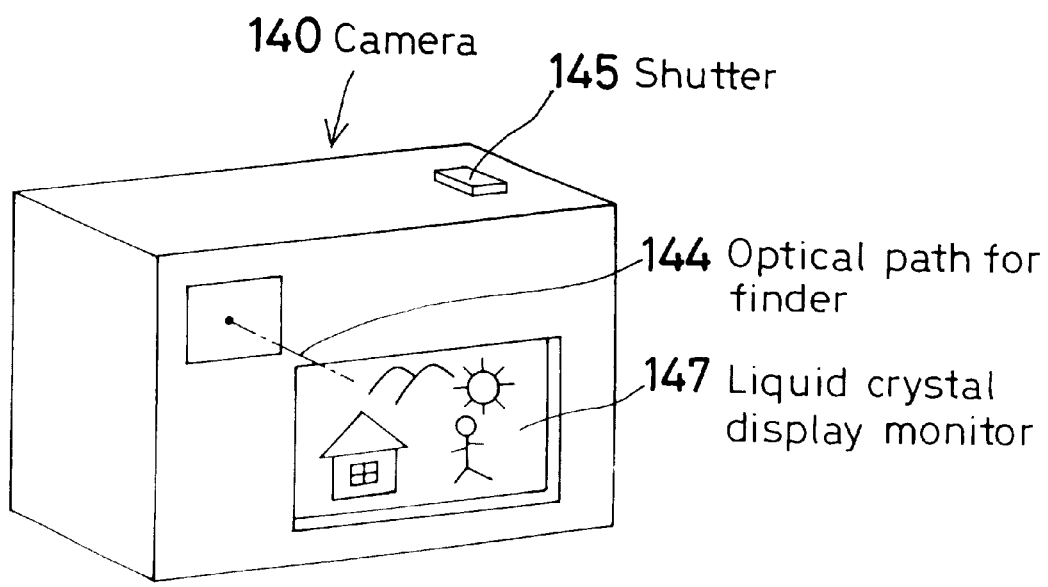
FIG. 9 is a perspective view of the electronic camera shown in FIG. 8, as viewed from the rear side thereof.
Figure 10:
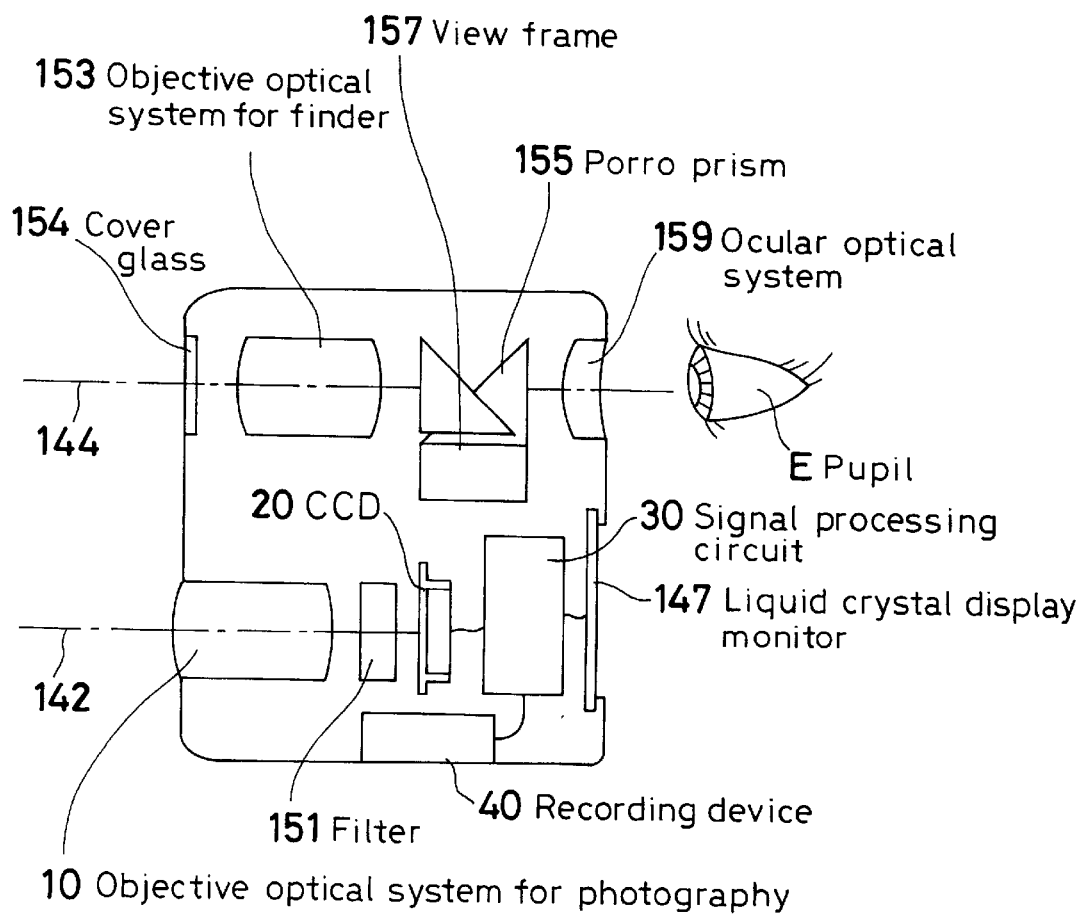
FIG. 10 is a sectional view showing the arrangement of the electronic camera in FIG. 8.

FIGS. 8 to 10 are conceptual views showing an arrangement in which the image pickup apparatus according to the present invention is arranged in the form of an electronic camera. FIG. 8 is a perspective view showing the external appearance of an electronic camera 140 as viewed from the front side thereof. FIG. 9 is a perspective view of the electronic camera 140 as viewed from the rear side thereof. FIG. 10 is a sectional view showing the arrangement of the electronic camera 140. In the illustrated example, the electronic camera 140 includes a photographic optical-system 141 having an optical path 142 for photography, a finder optical system 143 having an optical path 144 for a finder, a shutter 145, a flash 146, a liquid crystal display monitor 147, etc. When the shutter 145, which is placed on the top of the camera 140, is depressed, photography is performed through an objective optical system 10 for photography. An object image produced by the objective-optical system 10 for photography is formed on the image pickup surface of a CCD 20 (corresponding to the image pickup device in FIG. 1) through a filter 151, e.g. a low-pass filter, an infrared cutoff filter, etc. The object image received with the CCD 20 is processed in a signal processing circuit 30 and displayed as an electronic image on the liquid crystal display monitor 147 (corresponding to the display unit 50 in FIG. 1), which is provided on the rear of the camera 140. The signal processing circuit 30 is provided with a recording device 40 (corresponding to the storage unit in FIG. 1) to enable the photographed electronic image to be recorded. It should be noted that the recording device 40 may be provided separately from the signal processing circuit 30. The arrangement may also be such that the photographed electronic image is electronically recorded or written on a floppy disk or the like.

Furthermore, an objective optical system 153 for the finder is placed in the optical path 144 for the finder. A cover glass 154 is provided in front of the objective optical system 153. An object image produced by the objective optical system 153 for the finder is formed on a view frame 157 of a Porro prism 155, which is an image-erecting members. It should be noted that the view frame 157 is placed between a first reflecting surface and second reflecting surface of the Porro prism 155. An ocular optical system 159 is placed behind the Porro prism 155 to lead an erect image to an observer's eyeball E.

Figure 11A:
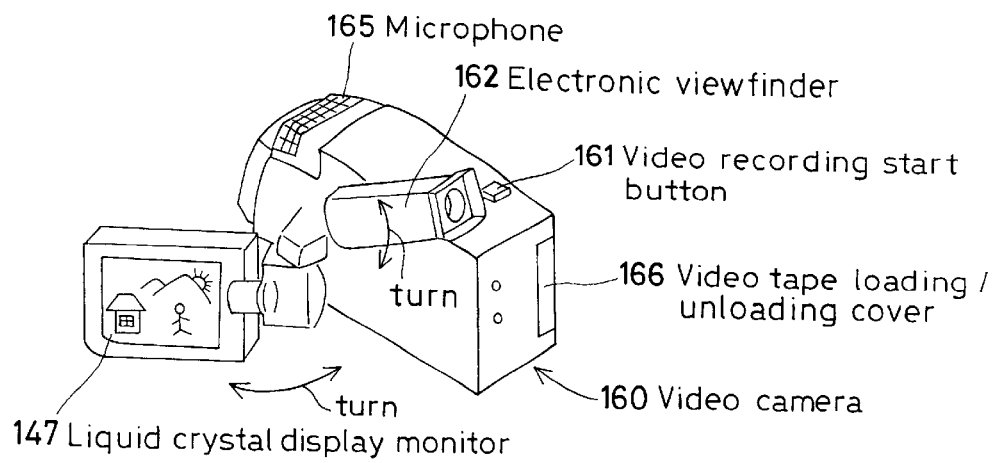
FIG. 11 is a conceptual view showing an image pickup apparatus according to the present invention as arranged in the form of a video camera.
Figure 11B:
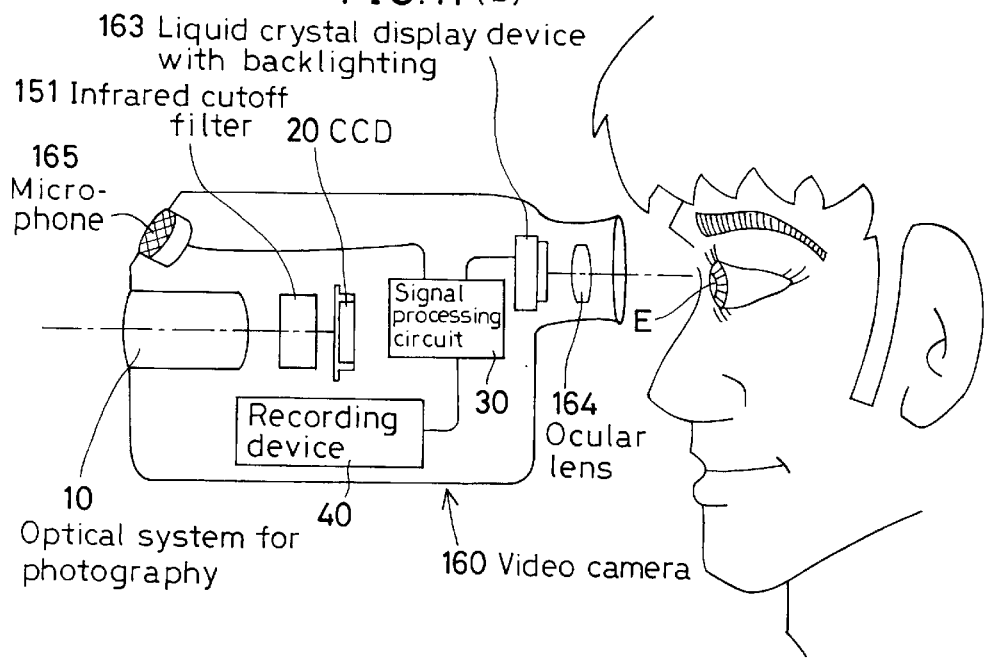
Figure 12:
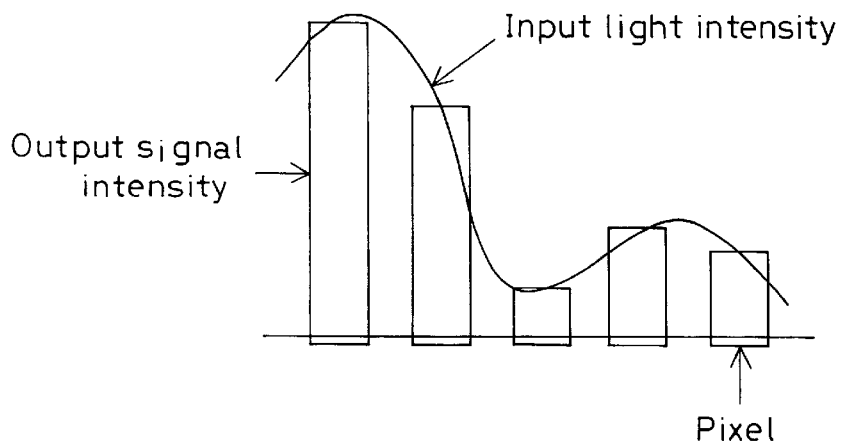
FIG. 12 is a conceptual view showing the relationship between the light intensity and the image signal intensity when an electronic image pickup device is used.
Figure 13A:
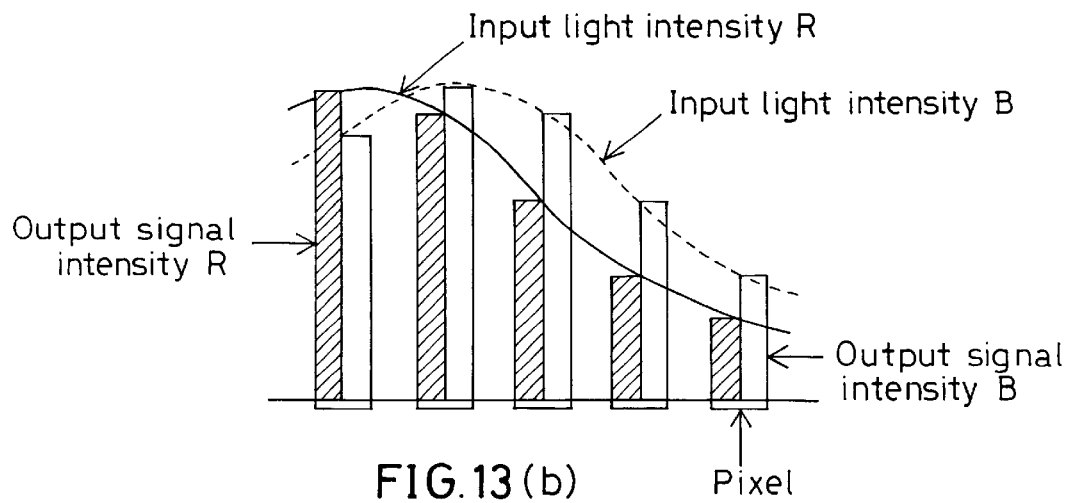
FIG. 13 is a conceptual view showing the relationship between color shift and the image signal intensity when an electronic image pickup device is used.
Figure 13B:
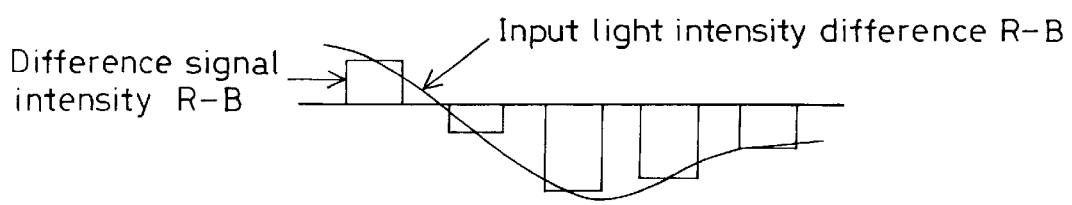

FIG. 11 is a conceptual view showing the image pickup apparatus according to the present invention as arranged in the form of a video camera. Part (a) of FIG. 11 is a perspective view showing the external appearance of a video camera 160, and part (b) of FIG. 11 is a sectional view showing the arrangement of the video camera 160. The video camera 160 has an electronic viewfinder 162 and a liquid crystal display monitor 147 in addition to an optical system 10 for photography. The electronic viewfinder 162 and the liquid crystal display monitor 147 correspond to the display unit 50 in FIG. 1. When a video recording start button 161 placed on the top of the video camera 160 is turned on, video shooting is performed through the optical system 10 for photography. An object image produced by the optical system 10 for photography is formed on the image pickup surface of a CCD 20 (corresponding to the image pickup device in FIG. 1) through a filter 151, e.g. a low-pass filter, an infrared cutoff filter, etc. The object image received with the CCD 20 is processed in a signal processing circuit 30 and displayed on a liquid crystal display device 163 with backlighting, which is placed within the electronic viewfinder 162. The displayed image can be observed as an enlarged image through an ocular lens 164. In addition, the object image is displayed on the liquid crystal display monitor 147, which is foldably mounted on the camera body. A video tape as a recording medium can be set in the video camera 160 by opening a cover 166 for loading and unloading a video tape. The photographed electronic image is recorded on the video tape, which serves as a recording device 40 (corresponding to the storage unit in FIG. 1), through the signal processing circuit 30. Further, the video camera 160 has a microphone 165 to perform speech information recording simultaneously with image signal recording.

As will be clear from the foregoing description and each example, according to the present invention, the image-forming performance of the optical system of the image pickup apparatus, the number of pixels of the image pickup device, and the pixel pitch are optimized. Therefore, it is possible to obtain a high-quality image comparable to silver halide photographs, particularly an image in which color shift is inconspicuous. In addition, because the arrangement is favorable for the size of the apparatus and the production cost, it is possible to obtain a compact and low-cost image pickup apparatus.

I claim:

1. An image pickup apparatus wherein an image of an object produced by an optical system is formed on an electronic image pickup device, thereby obtaining image information concerning the object, wherein said electronic image pickup device and said optical system satisfy the following conditions:

$$1.5 < P < 7.0 \tag{1}$$

$$3.0 < N < 20 \tag{2}$$

$$1.0 \times P < \delta < 5.0 \times P \tag{3}$$

$$n_L/n_T < 0.25 \tag{4}$$

where P is a pixel pitch (given in micrometers) of the image pickup device; N is the number of pixels (given in million) of the image pickup device; δ is a maximum value (given in micrometers) of an absolute value of lateral chromatic aberration for a wavelength of 620 nanometers or 460 nanometers in an area containing a center of an image plane and accounting for 90% of a whole image plane; and $n_T$ and $n_L$ are the number of lens elements constituting the optical system and the number of lens elements made of anomalous dispersion glass, respectively.

2. An image pickup apparatus according to claim 1, wherein said optical system has a detachable structure.

3. An image pickup apparatus according to claim 1, which satisfies the following conditions:

$$1.5 < P < 4.0 \tag{5}$$

$$4.0 < N < 20 \tag{6}$$

4. An image pickup apparatus according to claim 3, which satisfies the following condition:

$$6.0 < N < 20 \tag{7}$$

5. An image pickup apparatus according to claim 1, wherein said image pickup device is a device having a matrix or mosaic color filter array provided over a photo-electric conversion surface and satisfies the following condition:

$$\theta < 1.3 \times P + 4 \tag{8}$$

where θ is an angle at which a central ray of a light beam exiting from said optical system or a ray passing through a center of a stop is incident on the image pickup device at each point within 90% of an image circle.

6. An image pickup apparatus according to claim 5, which satisfies the following condition:

$$\theta < P + 4 \tag{9}$$

7. An image pickup apparatus according to claim 1, which satisfies the following condition:

$$1.5 \times P < 6 < 5.0 \times P \tag{10}$$

8. An image pickup apparatus according to claim 1, which satisfies the following condition:

$$n_L/n_T < 0.20 \tag{11}$$

* * * * *